United States Patent Office 3,846,195
Patented Nov. 5, 1974

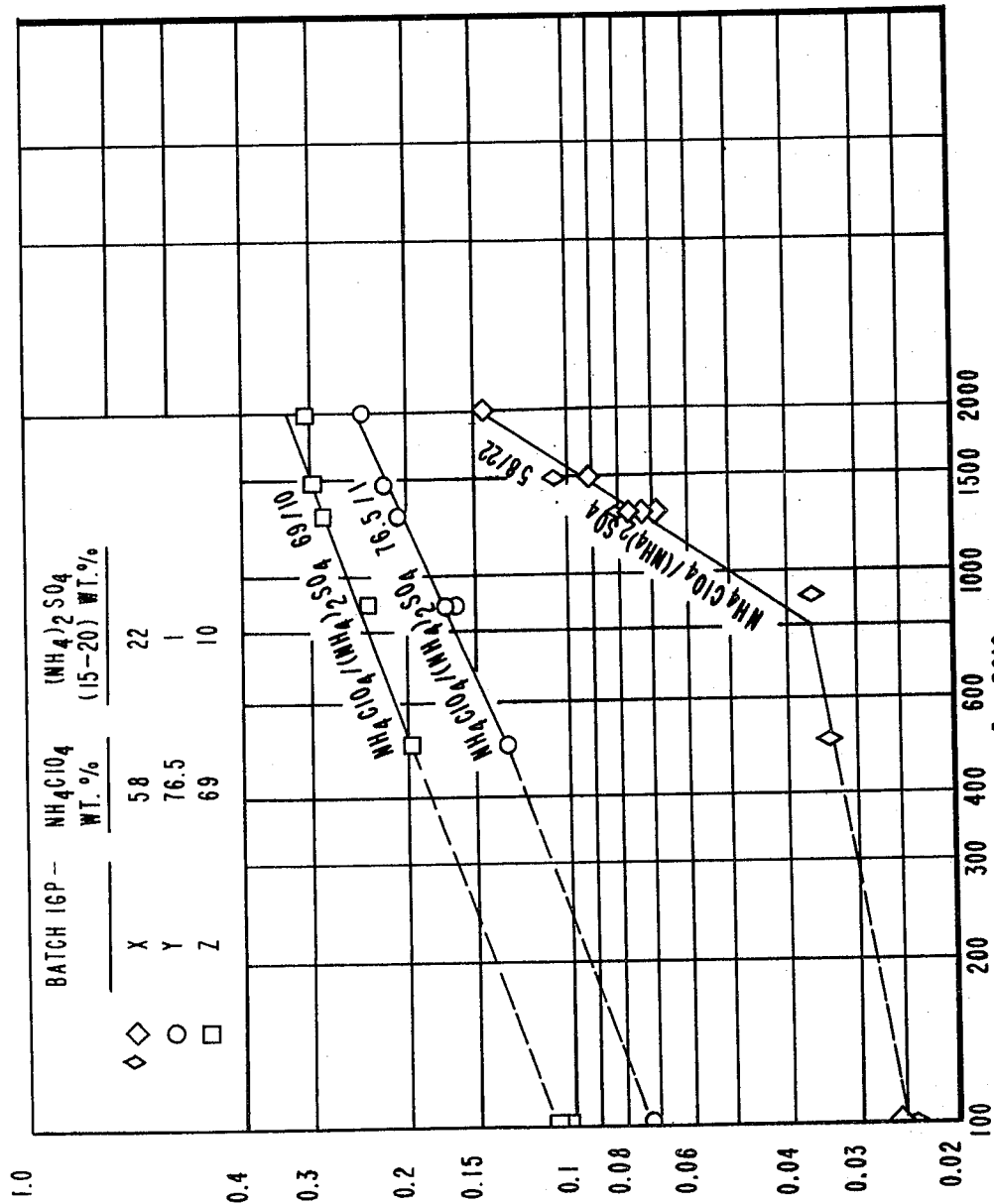

3,846,195
COMPOSITE POLYURETHANE PROPELLANTS WITH NEGATIVE PRESSURE EXPONENT OF AMMONIUM SULFATE
Gilbert A. Zimmerman, Sacramento, and Marshall L. Sherman, Fair Oaks, Calif., assignors to Aerojet-General Corporation, El Monte, Calif.
Filed Mar. 14, 1970, Ser. No. 25,606
Int. Cl. C06d 5/06; F02k 9/06
U.S. Cl. 149—19.4
8 Claims

ABSTRACT OF THE DISCLOSURE

This patent describes a novel solid rocket propellant formulation comprising a cross-linked polyether or polyester polyurethane binder and ammonium perchlorate oxidizer. The improvement comprising the addition thereto of an effective negative pressure exponent producing amount of ammonium sulfate. These formulations are particularly useful as gas generator propellants.

BACKGROUND OF THE INVENTION

Figure 1:
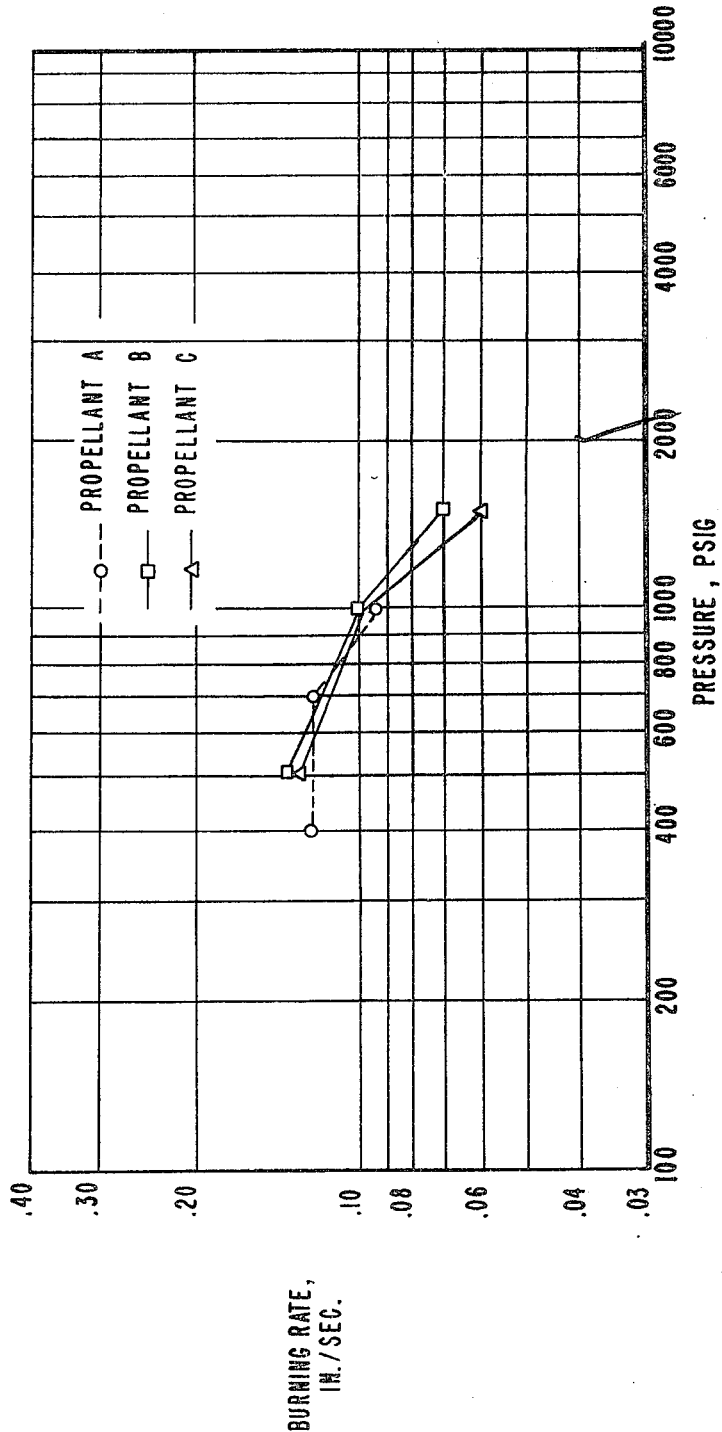

There has been a long recognized need for solid rocket propellants having negative pressure exponents to provide for the attainment of nearly neutral pressure time curves (near constant thrust) without having to resort to complicated grain designs. Another factor making propellants having negative pressure exponents important is that the effect of temperature on the burning rate of the propellant is thereby reduced which in turn reduces the pressure range of motor operation. In general, a reduction in the pressure range of a solid rocket motor permits the reduction in the weight of the casing. Thus, it can be seen that propellants having negative pressure exponents represent an important milestone in the art.

The phenomenon of a zero to negative pressure exponent for polyether polyurethane-ammonium perchlorate propellants has been reported before in the case where additives were used to reduce the burning rate of ammonium perchlorate propellants, or by the use of complicated grain designs. The use of exotic additives has many disadvantages which are recognized in the art. Likewise complicated grain designs pose many problems in fabrication, curing, and mold release. The present invention quite simply solves all of these problems by the use of ammonium sulfate as an additive in the propellant. This compound effectively produces a negative pressure exponent in a wide range of solid rocket propellants containing ammonium perchlorate oxidizers and cross-linked polyurethane binders.

SUMMARY OF THE INVENTION

Briefly, the present invention involves a novel solid rocket propellant formulation comprising a cross-linked polyether or polyester polyurethane binder and ammonium perchlorate oxidizer; the improvement comprising the addition thereto of an effective pressure exponent producing amount of ammonium sulfate. Preferably, the ammonium sulfate is used in an amount equal to about 1 to 31% by weight of the total weight of the propellant.

It is an object of the present invention to provide a novel class of solid rocket propellants, particularly useful for gas generation.

More specifically, it is an object of the present invention to provide a novel class of polyurethane-based solid rocket propellants having a negative pressure exponent.

Yet another object of the present invention is the provision of a solid rocket propellant having neutral pressure time curves without having a need of complicated grain designs.

These and other objects and advantages of this invention will be apparent from the more detailed description which follows taken in conjunction with the accompanying drawings.

DESCRIPTION OF PREFERRED EMBODIMENTS

The invention is based on the use of $(NH_4)_2SO_4$ in an ammonium perchlorate propellant with a polymeric binder to achieve a negative pressure exponent.

The following examples are presented solely to illustrate the invention and should not be regraded as limiting in any way. In the examples, the parts and percentages are by weight unless otherwise indicated.

EXAMPLE I

The following composition was made with the burning rates shown below:

| | Wt. percent |
|---|---|
| Ammonium perchlorate | 58.0 |
| $(NH_4)_2SO_4$ | 18.0 |
| Polypropylene glycol adduct of trimethylol propane—4000 mol. wt. | 14.18 |
| Polypropylene glycol—2000 mol. wt. | 1.37 |
| Polytetramethylene oxide diol—1000 mol. wt. | 0.74 |
| Triethanol amine—150 mol. wt. | 0.07 |
| Tolylene diisocyanate—174 mol. wt. | 1.59 |
| Dioctyl adipate | 6.00 |
| Ferric acetylacetonate | 0.05 |

CRAWFORD BOMB BURNING RATE DATA
[Burning rate, in./sec.]

| Pressure, p.s.i.g. | 1 x 6 in. strands | Pressure, p.s.i.g. | 1.75 in. O.D. x 0.375 in. I.D. x 2.5 in. long gr.ins |
|---|---|---|---|
| 400 | 0.124 | 500 | 0.131 |
| 700 | 0.120 | 1,000 | 0.093 |
| 400 | 0.124 | 500 | 0.131 |
| 700 | 0.120 | 1,000 | 0.093 |
| 1,000 | 0.090 | 1,500 | 0.067 |
| 1,500 | | Extinguished | |

Small grains (2 in. Lp x 2.062 in. O.D. x 0.388 in. I.D.) were fired in motors using a nozzle size $A_t$—$4.5 \times 10^{-3}$ in.$^2$ (assumed constant) with I.D. burning. The following results were obtained:

| | Duration, seconds | | Max. pressure | Pressure at tailoff |
|---|---|---|---|---|
| | Total | To max. pressure | | |
| Grain: | 12.18 | 4.52 | 1,385 | 1,385 |
| 2 | 11.24 | 4.07 | 1,442 | 1,442 |

Although the burning surface increases with this configuration, no increase in pressure was obtained once stable operation occurred. Burning rate vs. pressure obtained from these firings confirms the negative slope of the burning rate pressure curve.

EXAMPLE II

Solid strands and Crawford Bomb Motors of polyurethane propellants containing 58 weight percent ammonium perchlorate and 18 weight percent ammonium sulfate were fired for ballistic evaluation, and burning rates of approximately 0.1 in. per sec. and negative pressure exponents were obtained as shown in FIGURE 1. Composition of Propellant A in FIGURE 1 is the same composition as the propellant of Example I. Propellant B is of the same composition as Propellant A except that 0.25 wt. percent ferric acetylacetonate is substituted for 0.5 wt. percent ferric acetylacetonate. Propellant C has the following composition:

| | Weight percent |
|---|---|
| Ammonium perchlorate | 58.0 |
| (NH$_4$)$_2$SO$_4$ | 18.0 |
| Ferric acetylacetonate | 0.025 |
| Dioctyl adipate | 6.000 |
| Polypropylene glycol—2000 mol. wt | 1.366 |
| Polytetramethylene oxide diol—1000 mol. wt | 0.735 |
| Acrylonitrile adduct of diethanol amine | 0.117 |
| Polypropylene glycol adduct of trimethylol propane—4000 mol. wt | 14.161 |
| Tolylene diisocyanate | 1.596 |

In addition, the strands while igniting and burning at 400 p.s.i.g., the lowest pressure used, extinguished at 1000 to 1500 p.s.i.g. after ⅛ to ½ of the strand-length had burned although the small motors burned completely at 1500 p.s.i.g., the highest pressure tested.

EXAMPLE III

Figure 2:
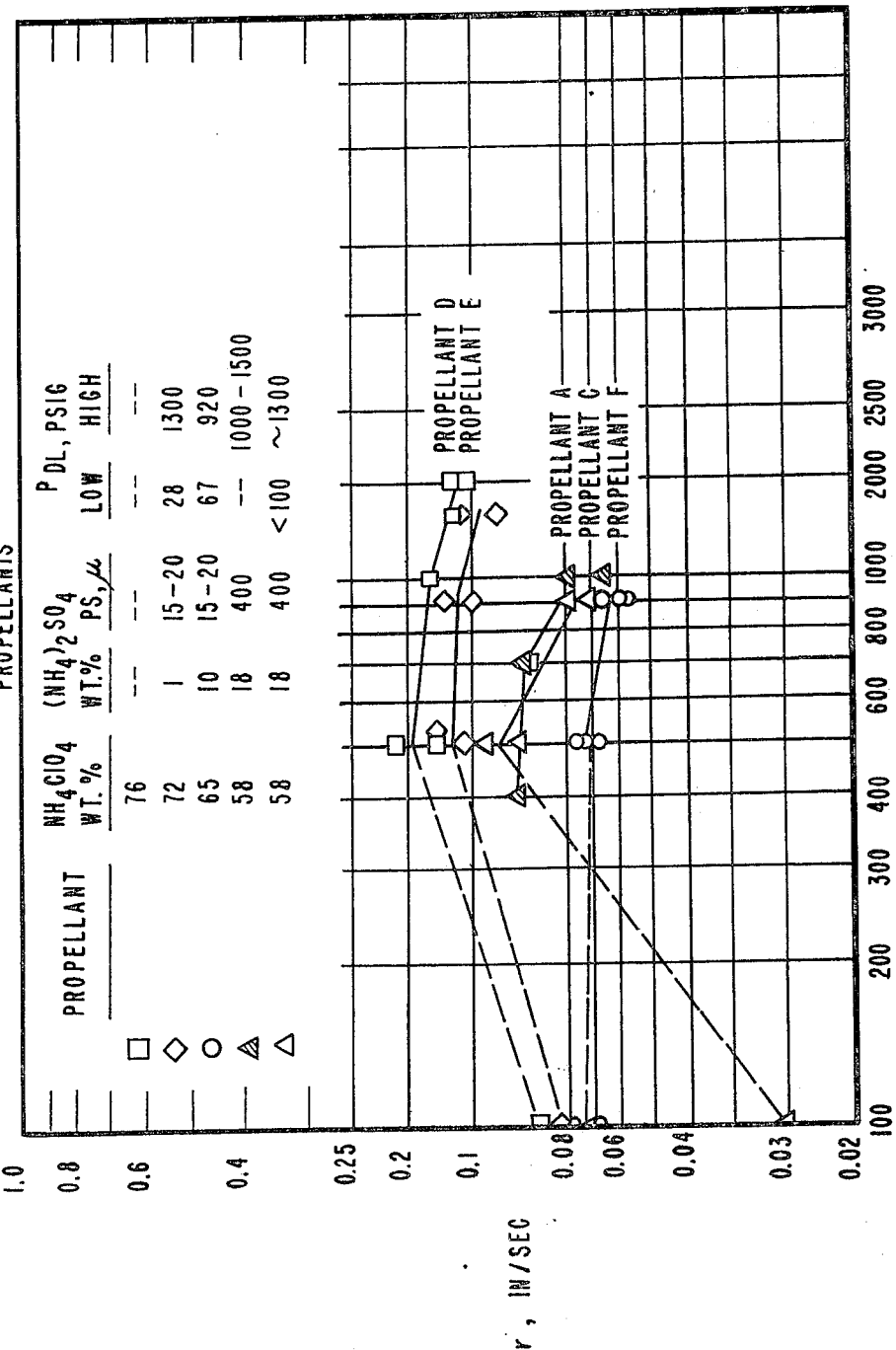

Further evaluation of this phenomenon is shown in FIGURE 2 which demonstrates that in a solid strand polyurethane propellant containing only ammonium perchlorate, a negative pressure exponent about 500 p.s.i.g. was also obtained. However, as the concentration of ammonium sulfate was increased from 1% to 18% by weight, the pressure exponent above the 500 p.s.i.g. level became more negative. Composition of formulations in FIGURE 2 were as follows. The composition of Propellant D is the same as Propellant C except for replacement of 58% ammonium perchlorate and 18% (NH$_4$)$_2$SO$_4$ with 76% ammonium perchlorate.

| | Weight, percent | |
|---|---|---|
| Propellant | E | F |
| Composition of— | | |
| Ammonium perchlorate | 72.00 | 65.00 |
| (NH$^4$)$^2$SO$^4$ | 1.00 | 10.00 |
| Ferric acetylacetonate | 0.025 | 0.025 |
| Dioctyl adipate | 6.750 | 6.250 |
| Polypropylene glycol—2,000 mol. wt | 1.564 | 1.448 |
| Polytetramethylene oxide diol—1,000 mol. wt | 0.837 | 0.775 |
| Acrylonitrile adduct of diethanol amine | 0.133 | 0.123 |
| Polypropylene glycol adduct of trimethylol propane—4,000 mol. wt | 16.126 | 14.930 |
| Tolylene diisocyanate | 1.565 | 1.449 |

The negative pressure exponent occurs only in propellants with a polyether or polyester polyurethane binder. The data in FIG. 3 shows normal burning rates vs. pressure curves with positive pressure exponents for the same type of propellant differing only in that a hydroxy-terminated polybutadiene-urethane binder was substituted for the polyether polyurethane.

The use of ammonium persulfate is particularly useful in providing gas generator propellants based on ammonium perchlorate which would have low flame temperatures without carbon in the exhaust. The feature has been demonstrated by theoretical calculation and smokeless exhaust in motor firings of the following propellants.

| | Compositions and flame temperature | |
|---|---|---|
| Weight percent: | | |
| NH$_4$ClO$_4$ | 58.0 | 58.0 |
| Ammonium sulfate | 18.0 | 22.0 |
| Polyurethane binder of type disclosed in Example I | 24.0 | 20.0 |
| Hydroxy-terminated polybutadiene-uerthane binder | | |
| Total | 100.0 | 100.0 |
| T$_c$, °F | 1,950 | 2,051 |
| Carbon (exhaust), percent | 0 | ≤1 |

The mechanical properties of a series of ammonium perchlorate-ammonium persulfate propellants containing ferric acetylacetone catalyst and dioctyl azelate plasticized-polyurethane binder were determined. The control propellant had a tensile strength of 94 p.s.i. but a low elongation of 9%. A companion batch was prepared to determine the effect of the elimination of ammonium sulfate on propellant cure and mechanical properties. This companion batch had a tensile strength of 102 p.s.i. and an elongation of 11%, values which indicate that effect of ammonium sulfate on propellant is slight. A reduction of ferric acetylacetonate catalyst from 0.05 weight percent to 0.025 weight percent resulted in a propellant with a tensile strength of 107 p.s.i. and an improved elongation of 17%.

The polyether-urethane binders used in this invention are those based on hydroxy-terminated polymers based on polymerized alkylene oxides or adducts of alkylene oxides and polyols such as glycerin or trimethylol propane. The polyesters are hydroxy-terminated polymers from a polyfunctional carboxylic acid and an excess of a polyol. The polyether or polyester is subsequently reacted with polyisocyanates in the presence of various catalysts, as is known to those skilled in the art.

Having fully described the invention, it is intended that it be limited only by the lawful scope of the appended claims.

We claim:

1. A novel solid rocket propellant formulation comprising a cross-linked polyether or polyester polyurethane binder and ammonium perchlorate oxidizer; the improvement comprising the addition thereto of an effective negative pressure exponent producing amount of ammonium sulfate.

2. A novel solid rocket propellant formulation comprising a cross-linked polyether polyurethane binder and ammonium perchlorate oxidizer; the improvement comprising the addition thereto of an effective negative pressure exponent producing amount of ammonium sulfate.

3. A novel solid rocket propellant formulation comprising a cross-linked polyester polyurethane binder and ammonium perchlorate oxidizer; the improvement comprising the addition thereto of an effective negative pressure exponent producing amount of ammonium sulfate.

4. A novel solid rocket propellant formulation comprising a cross-linked polyether or polyester polyurethane binder and ammonium perchlorate oxidizer; the improvement comprising the addition thereto of from about 1 to 18% by weight of the propellant of ammonium sulfate to produce a negative pressure exponent.

5. A novel solid rocket propellant formulation comprising a cross-linked plasticized polyether or polyester polyurethane binder and ammonium perchlorate oxidizer; the improvement comprising the addition thereto of an effective negative pressure exponent producing amount of ammonium sulfate.

6. A novel solid rocket motor containing a casing and a nozzle, the propellant within said casing comprising a cross-linked polyether or polyester polyurethane binder and ammonium perchlorate oxidizer; the improvement comprising the addition thereto of an effective negative pressure exponent producing amount of ammonium sulfate.

7. A novel solid rocket motor containing a casing and a nozzle, the propellant within said casing comprising a cross-linked polyether polyurethane binder and ammonium perchlorate oxidizer; the improvement comprising the addition thereto of an effective negative pressure exponent producing amount of ammonium sulfate.

8. A novel solid rocket motor containing a casing and a nozzle, the propellant within said casing comprising a cross-linked polyester polyurethane binder and ammonium perchlorate oxidizer; the improvement comprising the addition thereto of an effective negative pressure exponent producing amount of ammonium sulfate.

References Cited

UNITED STATES PATENTS 3,147,160  9/1964  McCrone _____ 149—5
3,529,042  9/1964  Lippert _____ 149—19 X
3,532,567  10/1970  Winkler et al. _____ 149—19

BENJAMIN R. PADGETT, Primary Examiner

U.S. Cl. X.R.

149—19.5, 19.6; 60—253